(12) United States Patent  
Bhasin et al.

(10) Patent No.: US 12,166,884 B2
(45) Date of Patent: Dec. 10, 2024

(54) SYSTEM, METHOD, AND COMPUTER PROGRAM PRODUCT FOR THIRD-PARTY AUTHORIZATION

(71) Applicant: Visa International Service Association, San Francisco, CA (US)

(72) Inventors: Gurpreet Singh Bhasin, Fremont, CA (US); Deepak Dhiman, San Ramon, CA (US); Eric Willard Chamberlain, Mill Creek, WA (US)

(73) Assignee: Visa International Service Association, San Francisco, CA (US)

( * ) Notice: Subject to any disclaimer, the term of this patent is extended or adjusted under 35 U.S.C. 154(b) by 279 days.

(21) Appl. No.: 17/621,761

(22) PCT Filed: Jul. 6, 2020

(86) PCT No.: PCT/US2020/040857
§ 371 (c)(1),
(2) Date: Dec. 22, 2021

(87) PCT Pub. No.: WO2021/007142
PCT Pub. Date: Jan. 14, 2021

(65) Prior Publication Data
US 2022/0271935 A1  Aug. 25, 2022

Related U.S. Application Data

(60) Provisional application No. 62/870,834, filed on Jul. 5, 2019.

(51) Int. Cl.
*H04L 9/32* (2006.01)
*H04L 9/00* (2022.01)
*H04L 9/08* (2006.01)

(52) U.S. Cl.
CPC ............ *H04L 9/3213* (2013.01); *H04L 9/006* (2013.01); *H04L 9/0819* (2013.01); *H04L 9/3247* (2013.01)

(58) Field of Classification Search
None
See application file for complete search history.

(56) References Cited

U.S. PATENT DOCUMENTS

2013/0205133 A1    8/2013  Hess
2014/0310792 A1*  10/2014  Hyland ............... H04L 63/0815
                                                           726/8

(Continued)

FOREIGN PATENT DOCUMENTS

CN           107918731 A      4/2018

OTHER PUBLICATIONS

Watt, "Proof-of-Possession Tokens in Microservice Architectures", Omegapoint 2018, 44 pages.

*Primary Examiner* — Philip J Chea
*Assistant Examiner* — James Ross Hollister
(74) *Attorney, Agent, or Firm* — The Webb Law Firm

(57) ABSTRACT

A method, system, and computer program product is provided for third-party authorization. The method includes generating an authorization code, encrypting the authorization code with a public key associated with a first system, resulting in an encrypted authorization code, transmitting the encrypted authorization code to the first system, receiving, from the first system, a digitally signed authorization code generated by the first system based on the authorization code and a private key corresponding to the public key associated with the first system, verifying the digitally signed authorization code based on the public key and the authorization code, and in response to verifying the digitally signed authorization code, transmitting an access token to (Continued)

the first system, wherein the access token is configured to authorize a user with the first system.

16 Claims, 4 Drawing Sheets

(56) References Cited

U.S. PATENT DOCUMENTS

| | | | |
|---|---|---|---|
| 2015/0032625 A1 | 1/2015 | Dill et al. | |
| 2016/0050193 A1 | 2/2016 | Kanov et al. | |
| 2016/0148197 A1 | 5/2016 | Dimmick | |
| 2017/0070500 A1 | 3/2017 | Hockey et al. | |
| 2017/0099148 A1 | 4/2017 | Ochmanski et al. | |
| 2017/0141926 A1 | 5/2017 | Xu et al. | |
| 2017/0149740 A1* | 5/2017 | Mansour | H04L 63/045 |
| 2017/0223005 A1 | 8/2017 | Birgisson et al. | |
| 2019/0081943 A1* | 3/2019 | Yamanakajima | H04L 63/083 |
| 2020/0351240 A1* | 11/2020 | Gould | H04L 9/3247 |
| 2021/0359989 A1* | 11/2021 | Dunjic | H04L 9/0891 |

* cited by examiner

SYSTEM, METHOD, AND COMPUTER PROGRAM PRODUCT FOR THIRD-PARTY AUTHORIZATION

CROSS REFERENCE TO RELATED APPLICATIONS

This application is the United States national phase of International Application No. PCT/US2020/040857 filed Jul. 6, 2020, and claims priority to U.S. Provisional Patent Application No. 62/870,834, filed on Jul. 5, 2019, the disclosures of which are incorporated by reference herein in their entirety.

BACKGROUND

1. Technical Field

This disclosure relates generally to authorizing a user and, in non-limiting embodiments, systems, methods, and computer program products for third-party authorization.

2. Technical Considerations

Existing standards and protocols for authorizing a user with a system via a third-party authorization system present several security vulnerabilities. For example, using the Open Authorization (OAuth) standard, an attacker could intercept an authorization code and/or access token to gain access to a system without permission. These security vulnerabilities are particularly concerning if such third-party authorization is used for accessing payment systems and/or conducting payment transactions.

SUMMARY

According to non-limiting embodiments or aspects, provided is a computer-implemented method, comprising: generating, with at least one processor, an authorization code; encrypting, with at least one processor, the authorization code with a public key associated with a first system, resulting in an encrypted authorization code; transmitting the encrypted authorization code to the first system; receiving, from the first system, a digitally signed authorization code generated by the first system based on the authorization code and a private key corresponding to the public key associated with the first system; verifying, with at least one processor, the digitally signed authorization code based on the public key and the authorization code; and in response to verifying the digitally signed authorization code, transmitting an access token to the first system, wherein the access token is configured to authorize a user with the first system.

In non-limiting embodiments or aspects, the method further comprises receiving, from a second system, access grant data comprising a user identifier associated with the user and at least one grant, the authorization code is generated and/or encrypted in response to receiving the access grant data. In non-limiting embodiments or aspects, transmitting the encrypted authorization code to the first system comprises transmitting the encrypted authorization code to a second system, wherein the second system provides the encrypted authorization code to the first system. In non-limiting embodiments or aspects, the method further comprises: receiving a request through a first website associated with the first system, the request initiated by the user through a computing device; redirecting the computing device of the user from the first website associated with the first system to a second website associated with a second system, wherein the second website is configured to receive credentials associated with the user; and receiving, from the second system, a request for the authorization code. In non-limiting embodiments or aspects, the method further comprises: receiving, from the first system, a digitally signed access token generated by the first system based on the access token and the private key; verifying, with at least one processor, the digitally signed access token based on the public key and the access token; and in response to verifying the digitally signed access token, authorizing the user with the second system.

According to non-limiting embodiments or aspects, provided is a system comprising at least one processor programmed or configured to: generate an authorization code; encrypt the authorization code with a public key associated with a first system, resulting in an encrypted authorization code; transmit the encrypted authorization code to the first system; receive, from the first system, a digitally signed authorization code generated by the first system based on the authorization code and a private key corresponding to the public key associated with the first system; verify the digitally signed authorization code based on the public key and the authorization code; and in response to verifying the digitally signed authorization code, transmit an access token to the first system, wherein the access token is configured to authorize a user with the first system.

In non-limiting embodiments or aspects, the at least one processor is further programmed or configured to receive, from a second system, access grant data comprising a user identifier associated with the user and at least one grant, wherein the authorization code is generated and/or encrypted in response to receiving the access grant data. In non-limiting embodiments or aspects, wherein transmitting the encrypted authorization code to the first system comprises transmitting the encrypted authorization code to a second system, the second system provides the encrypted authorization code to the first system. In non-limiting embodiments or aspects, the at least one processor is further programmed or configured to: receive a request through a first website associated with the first system, the request initiated by the user through a computing device; redirect the computing device of the user from the first website associated with the first system to a second website associated with a second system, wherein the second website is configured to receive credentials associated with the user; and receive, from the second system, a request for the authorization code. In non-limiting embodiments or aspects, the at least one processor is further programmed or configured to: receive, from the first system, a digitally signed access token generated by the first system based on the access token and the private key; verify, with at least one processor, the digitally signed access token based on the public key and the access token; and in response to verifying the digitally signed access token, authorize the user with the second system.

According to non-limiting embodiments or aspects, provided is a computer program product comprising at least one non-transitory computer-readable medium including program instructions that, when executed by at least one processor, cause the at least one processor to: generate an authorization code; encrypt the authorization code with a public key associated with a first system, resulting in an encrypted authorization code; transmit the encrypted authorization code to the first system; receive, from the first system, a digitally signed authorization code generated by the first system based on the authorization code and a private key corresponding to the public key associated with the first system; verify the digitally signed authorization code based on the public key and the authorization code; and in response to verifying the digitally signed authorization code, transmit an access token to the first system, wherein the access token is configured to authorize a user with the first system.

According to non-limiting embodiments or aspects, provided is a computer-implemented method, comprising: receiving, with at least one processor of a first system, an encrypted authorization code from an authorization system; decrypting, with the at least one processor, the encrypted authorization code based on a private key associated with the first system, resulting in an authorization code; digitally signing, with the at least one processor, the authorization code based on the private key, resulting in a digitally signed authorization code; transmitting the digitally signed authorization code to the authorization system; and receiving, with the at least one processor, an access token from the authorization system, the access token configured to authorize a user with the first system. In non-limiting embodiments or aspects, the method further comprises: digitally signing, with at least one processor, the access token based on the private key, resulting in a digitally signed access token; and transmitting the digitally signed access token to the authorization system.

In non-limiting embodiments or aspects, the method further comprises: receiving a request initiated by the user through a first website associated with the first system; and redirecting the computing device of the user from the first website associated with the first system to a second website associated with a second system, wherein the second website is configured to receive credentials associated with the user. In non-limiting embodiments or aspects, receiving the encrypted authorization code from the authorization system comprises receiving the encrypted authorization code from a second system, wherein the second system receives the encrypted authorization code from the authorization system.

According to non-limiting embodiments or aspects, provided is a system comprising at least one processor programmed or configured to: receive an encrypted authorization code from an authorization system; decrypt the encrypted authorization code based on a private key associated with the first system, resulting in an authorization code; digitally sign the authorization code based on the private key, resulting in a digitally signed authorization code; transmit the digitally signed authorization code to the authorization system; and receive an access token from the authorization system, the access token configured to authorize a user with the first system.

In non-limiting embodiments or aspects, the at least one processor is further programmed or configured to: digitally sign the access token based on the private key, resulting in a digitally signed access token; and transmit the digitally signed access token to the authorization system. In non-limiting embodiments or aspects, the at least one processor is further programmed or configured to: receive a request initiated by the user through a first website associated with the first system; and redirect the computing device of the user from the first website associated with the first system to a second website associated with a second system, wherein the second website is configured to receive credentials associated with the user. In non-limiting embodiments or aspects, receiving the encrypted authorization code from the authorization system comprises receiving the encrypted authorization code from a second system, wherein the second system receives the encrypted authorization code from the authorization system.

According to non-limiting embodiments or aspects, provided is a computer program product comprising at least one non-transitory computer-readable medium including program instructions that, when executed by at least one processor, cause the at least one processor to: receive an encrypted authorization code from an authorization system; decrypt the encrypted authorization code based on a private key associated with the first system, resulting in an authorization code; digitally sign the authorization code based on the private key, resulting in a digitally signed authorization code; transmit the digitally signed authorization code to the authorization system; and receive an access token from the authorization system, the access token configured to authorize a user with the first system.

Other non-limiting embodiments or aspects will be set forth in the following numbered clauses:

Clause 1: A computer-implemented method, comprising: generating, with at least one processor, an authorization code; encrypting, with at least one processor, the authorization code with a public key associated with a first system, resulting in an encrypted authorization code; transmitting the encrypted authorization code to the first system; receiving, from the first system, a digitally signed authorization code generated by the first system based on the authorization code and a private key corresponding to the public key associated with the first system; verifying, with at least one processor, the digitally signed authorization code based on the public key and the authorization code; and in response to verifying the digitally signed authorization code, transmitting an access token to the first system, wherein the access token is configured to authorize a user with the first system.

Clause 2: The computer-implemented method of clause 1, further comprising receiving, from a second system, access grant data comprising a user identifier associated with the user and at least one grant, wherein the authorization code is generated and/or encrypted in response to receiving the access grant data.

Clause 3: The computer-implemented method of clauses 1 or 2, wherein transmitting the encrypted authorization code to the first system comprises transmitting the encrypted authorization code to a second system, wherein the second system provides the encrypted authorization code to the first system.

Clause 4: The computer-implemented method of any of clauses 1-3, further comprising: receiving a request through a first website associated with the first system, the request initiated by the user through a computing device; redirecting the computing device of the user from the first website associated with the first system to a second website associated with a second system, wherein the second website is configured to receive credentials associated with the user; and receiving, from the second system, a request for the authorization code.

Clause 5: The computer-implemented method of any of clauses 1-4, further comprising: receiving, from the first system, a digitally signed access token generated by the first system based on the access token and the private key; verifying, with at least one processor, the digitally signed access token based on the public key and the access token; and in response to verifying the digitally signed access token, authorizing the user with the second system.

Clause 6: A system comprising at least one processor programmed or configured to: generate an authorization code; encrypt the authorization code with a public key associated with a first system, resulting in an encrypted authorization code; transmit the encrypted authorization code to the first system; receive, from the first system, a digitally signed authorization code generated by the first system based on the authorization code and a private key corresponding to the public key associated with the first system; verify the digitally signed authorization code based on the public key and the authorization code; and in response to verifying the digitally signed authorization code, transmit an access token to the first system, wherein the access token is configured to authorize a user with the first system.

Clause 7: The system of clause 6, wherein the at least one processor is further programmed or configured to receive, from a second system, access grant data comprising a user identifier associated with the user and at least one grant, wherein the authorization code is generated and/or encrypted in response to receiving the access grant data.

Clause 8: The system of clauses 6 or 7, wherein transmitting the encrypted authorization code to the first system comprises transmitting the encrypted authorization code to a second system, wherein the second system provides the encrypted authorization code to the first system.

Clause 9: The system of any of clauses 6-8, wherein the at least one processor is further programmed or configured to: receive a request through a first website associated with the first system, the request initiated by the user through a computing device; redirect the computing device of the user from the first website associated with the first system to a second website associated with a second system, wherein the second website is configured to receive credentials associated with the user; and receive, from the second system, a request for the authorization code.

Clause 10: The system of any of clauses 6-9, wherein the at least one processor is further programmed or configured to: receive, from the first system, a digitally signed access token generated by the first system based on the access token and the private key; verify, with at least one processor, the digitally signed access token based on the public key and the access token; and in response to verifying the digitally signed access token, authorize the user with the second system.

Clause 11: A computer program product comprising at least one non-transitory computer-readable medium including program instructions that, when executed by at least one processor, cause the at least one processor to: generate an authorization code; encrypt the authorization code with a public key associated with a first system, resulting in an encrypted authorization code; transmit the encrypted authorization code to the first system; receive, from the first system, a digitally signed authorization code generated by the first system based on the authorization code and a private key corresponding to the public key associated with the first system; verify the digitally signed authorization code based on the public key and the authorization code; and in response to verifying the digitally signed authorization code, transmit an access token to the first system, wherein the access token is configured to authorize a user with the first system.

Clause 12: A computer-implemented method, comprising: receiving, with at least one processor of a first system, an encrypted authorization code from an authorization system; decrypting, with the at least one processor, the encrypted authorization code based on a private key associated with the first system, resulting in an authorization code; digitally signing, with the at least one processor, the authorization code based on the private key, resulting in a digitally signed authorization code; transmitting the digitally signed authorization code to the authorization system; and receiving, with the at least one processor, an access token from the authorization system, the access token configured to authorize a user with the first system.

Clause 13: The computer-implemented method of clause 12, further comprising: digitally signing, with at least one processor, the access token based on the private key, resulting in a digitally signed access token; and transmitting the digitally signed access token to the authorization system.

Clause 14: The computer-implemented method of clauses 12 or 13, further comprising: receiving a request initiated by the user through a first website associated with the first system; and redirecting the computing device of the user from the first website associated with the first system to a second website associated with a second system, wherein the second website is configured to receive credentials associated with the user.

Clause 15: The computer-implemented method of any of clauses 12-14, wherein receiving the encrypted authorization code from the authorization system comprises receiving the encrypted authorization code from a second system, wherein the second system receives the encrypted authorization code from the authorization system.

Clause 16: A system comprising at least one processor programmed or configured to: receive an encrypted authorization code from an authorization system; decrypt the encrypted authorization code based on a private key associated with the first system, resulting in an authorization code; digitally sign the authorization code based on the private key, resulting in a digitally signed authorization code; transmit the digitally signed authorization code to the authorization system; and receive an access token from the authorization system, the access token configured to authorize a user with the first system.

Clause 17: The system of clause 16, wherein the at least one processor is further programmed or configured to: digitally sign the access token based on the private key, resulting in a digitally signed access token; and transmit the digitally signed access token to the authorization system.

Clause 18: The system of clauses 16 or 17, wherein the at least one processor is further programmed or configured to: receive a request initiated by the user through a first website associated with the first system; and redirect the computing device of the user from the first website associated with the first system to a second website associated with a second system, wherein the second website is configured to receive credentials associated with the user.

Clause 19: The system of any of clauses 16-18, wherein receiving the encrypted authorization code from the authorization system comprises receiving the encrypted authorization code from a second system, wherein the second system receives the encrypted authorization code from the authorization system.

Clause 20: A computer program product comprising at least one non-transitory computer-readable medium including program instructions that, when executed by at least one processor, cause the at least one processor to: receive an encrypted authorization code from an authorization system; decrypt the encrypted authorization code based on a private key associated with the first system, resulting in an authorization code; digitally sign the authorization code based on the private key, resulting in a digitally signed authorization code; transmit the digitally signed authorization code to the authorization system; and receive an access token from the authorization system, the access token configured to authorize a user with the first system.

Clause 21: The computer-implemented method of any of clauses 1-5, further comprising: verifying, with at least one processor, an authorization of the first system is active; and in response to verifying the authorization of the first system and the digitally signed access token, authorizing the user with the second system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying figures, in which.

DESCRIPTION OF THE PREFERRED EMBODIMENTS

Figure 1:
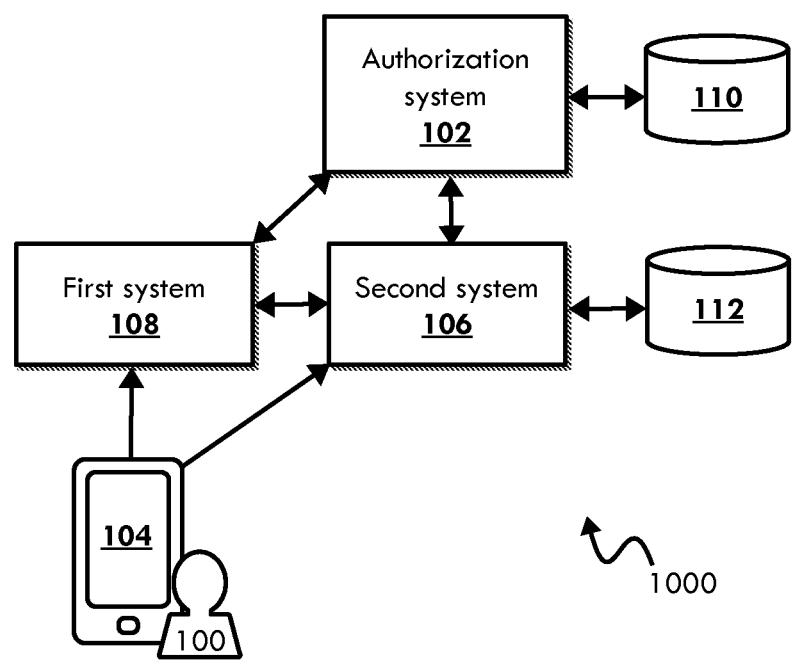
FIG. 1 is a schematic diagram of a system for third-party authorization according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" (GUI) refers to a generated display, such as one or more GUIs with which a user may interact, either directly or indirectly (e.g., through a keyboard, mouse, touchscreen, etc.).

In non-limiting embodiments, systems and methods are provided for enabling a first system to provide a user access based on an authorization provided by another system. As an example, some non-limiting embodiments may be implemented as an enhancement to the Open Authorization (OAuth) protocol. However, it will be appreciated that non-limiting embodiments may also differ from OAuth and may be implemented together or separate from any existing standards and/or protocols.

The systems and methods described herein provide enhanced security for actions committed by a first system through a second system on behalf of a user (e.g. allowing a first system to make a payment on behalf of a user). The enhanced security may be realized through the features described herein including, but not limited to, an arrangement uniquely allowing a user to revoke authorization of the first system to take actions on the user's behalf and allowing an access token, refresh token, and/or authorization code to be digitally signed by the first system. Currently, the OAuth protocol does not allow for an authorization to be revoked. By allowing for revocation, the user is provided with increased control over the authorization of the first system. The user is able to more proactively react to events that may require that the authorization to be revoked prior to the normal expiration of the token, such as a known breach of security. Moreover, the use of digitally signed tokens and authorization codes increases security by ensuring that the requests sent to the second system are actually coming from the first system, and instead are not being sent by an imposter. The digitally signed tokens allow this increased security without the need of additional actions by the user for each action taken by the first system, thereby reducing the amount of network communication.

FIG. 1 depicts a system 1000 for third-party authorization according to a non-limiting embodiment. The system 1000 includes an authorization system 102 in communication with an authorization database 110 and a second system 106. The second system 106 may also be in communication with a user device 104 operated by a user 100. The user device 104 may include a computing device. The second system 106 may be a system, such as one or more computing devices running one or more software programs, with which the user 100 and/or user device 104 has been registered. For example, the second system 106 may be a social network, a forum (e.g., message board, media hosting service, and/or the like), a retailer, an email provider service, a media streaming service, and/or the like. The user 100 may have an account with the second system 106 that is represented with account data in an account database 112 in communication with the second system 106. The account data in the account database 112 may include user credentials, such as user name, password, PIN, and/or the like, associated with each registered user of a plurality of users registered with the second system 106.

Still referring to FIG. 1, in non-limiting embodiments, the second system 106 may be registered with the authorization system 102 to provide authorization services for the first system 108 and/or other systems with respect to the user 100 and/or user device 104 and other users and/or user devices. As an example, the second system 106 may be registered with the authorization system 102 by being preapproved by the authorization system 102, such that the authorization system 102 recognizes the second system 106 as valid. The authorization system 102 may include a server and may be operated by (e.g., under control of) the second system 106, the user 100, or a third party. The third party may be associated with the user 100. The user 100 may be an employee, authorized user, client, customer, contractor, and/or the like of the third party. The third party may be the client, contractor, and/or the like of the user 100. The authorization system 102 may include a server. The first system 108 may include a service provider, social network, merchant system, and/or the like with which the user 100 and/or user device 104 seeks to interact with. Thus, in non-limiting embodiments, the user 100 may authorize himself or herself with the first system 108 based on user credentials and/or other account information used and/or provided to the second system 106.

In non-limiting embodiments, and with continued reference to FIG. 1, the user device 104 may seek access to a website and/or service operated by the first system 108. Upon the user 100 requesting access through the user device 104, the first system 108 redirects the user device 104 to the second system 106 (e.g., by redirecting a web browser on the user device 104 to a website offered or hosted by the second system 106). Through a website or service of the second system 106, the user 100 may input credentials (e.g., user name, password, PIN, account identifier, etc.) to authenticate himself or herself. Through the website or service of the second system 106, after being authenticated, the user 100 may choose one or more selectable options on a GUI to grant the first system 108 access privileges. The one or more selectable options available for selection may vary depending on the user 100 and/or the entity associated with the first system 108. As an example, an identifier of the first system 108 may be displayed. In some non-limiting embodiments, specific permissions may be shown on the GUI with selectable options such that the user 100 can choose one or more selectable options to customize the permissions that will be granted to the first system 108. Such permissions may include the sharing of personal information or a subset thereof, as an example, a time limit on such permission, and/or other restrictions and/or parameter settings.

Still referring to FIG. 1, the second system 106 may communicate with the authorization system 102 to cause the authorization system 102 to provide an authorization code. For example, the second system 106 may invoke one or more APIs to request an authorization code from the authorization system 102. The second system 106 may send access grant data (e.g., a user identifier associated with the user and at least one grant of access) to the authorization system 102. The access grant data may be stored in the account database 112. The authorization system 102 may then generate an authorization code based on the access grant data and in response to authorizing the user. In some examples, an authorization code may already exist and/or may be obtained from another system. In some examples, the authorization system 102 may encrypt the authorization code with a public key associated with a private key held by the first system 108. The authorization code may be valid for a predetermined amount of time, for example 1 minute, 5 minutes, 10 minutes, 1 hour, 1 day, or until a specified expiration date and/or time. The generation/encryption of the authorization code may be in response to receiving the access grant data and/or authorizing the user. The encrypted authorization code is transmitted to the second system 106 which, in turn, transmits the encrypted authorization code to the first system 108. In other examples, the encrypted authorization code may be transmitted directly to the first system 108.

With continued reference to FIG. 1, the first system 108 receives the encrypted authorization code. The first system 108 is configured to decrypt the authorization code to obtain a decrypted authorization code (e.g., a plaintext authorization code) that can be exchanged for an access token (e.g., such as a Javascript Object Notation (JSON) Web Token (JWT) payload) for granting the user device 104 access to the first system 108. The decryption may be based on a private key associated with the first system 108. To obtain the access token, the first system 108 may digitally sign the authorization code with the private key to generate a digitally signed authorization code. The digitally signed authorization code may then be transmitted to the authorization system 102 to request an access token. The authorization system 102 may use the public key to verify the digital signature generated by the first system 108 and, in response to verifying the digitally signed authorization code, may return the access token to the first system 108. The access token may be transmitted in plaintext or may be encrypted using the public key, as an example. The access token may then be used to grant access to the user 100 and/or user device 104. The access token may be valid for a predetermined period of time, for example, 15 minutes, 1 hour, 1 day, or until a specified expiration date or time. The predetermined validity time for the access token may be longer than the predetermined validity time of the authorization code.

In non-limiting embodiments, and with continued reference to FIG. 1, the authorization system 102 may maintain a revocation list in the authorization database 110 or elsewhere such that issued access tokens may be revoked to prevent continued use. Before the authorization system 102 grants access to the first system 108, the authorization system 102 may check to ensure the first system still has an active authorization. The authorization system 102 may compare each access token against the revocation list to determine if the token is still valid. If the access token is not valid, the first system 108 will not be granted access. The user 100 may withdraw (e.g., revoke) authorization of the first system 108. This may be requested through the website and/or service of the second system 106. The website and/or service of the second system 106 may be accessed directly, or through the website or service of the first system 108. The user 100 may then withdraw the grant of access (e.g., access privileges) of the first system 108.

Still referring to FIG. 1, the first system 108 may be configured to refresh the access token. The first system 108 may communicate a refresh token to the authorization system 102. The refresh token may be digitally signed by the first system 108 with the private key associated with the first system 108. The authorization system 102 may use the public key to verify the digital signature generated by the first system 108 and, in response to verifying the digitally signed response token, may return the access token to the first system 108. The authorization system 102 may compare the refresh token to the revocation list. If the access privileges to the first system 108 has been revoked, an access token may not be returned. The refresh token may be valid for a predetermined period of time, for example, 1 hour, 1 week, or 1 year, and/or until a specified expiration date and/or time.

The predetermined validity time of the refresh token may be longer than the predetermined validity time of the access token. The user 100 may renew the refresh token. In non-limiting embodiments, if the first system 108 attempts to complete a transaction with the second system 106 after the validity of the refresh token ends, the second system 106 may communicate with the user 100 to determine if the refresh token should be renewed. If the user 100 requests renewal of the refresh token, the second system 106 will deliver a new refresh token to the first system 108.

Figure 2:
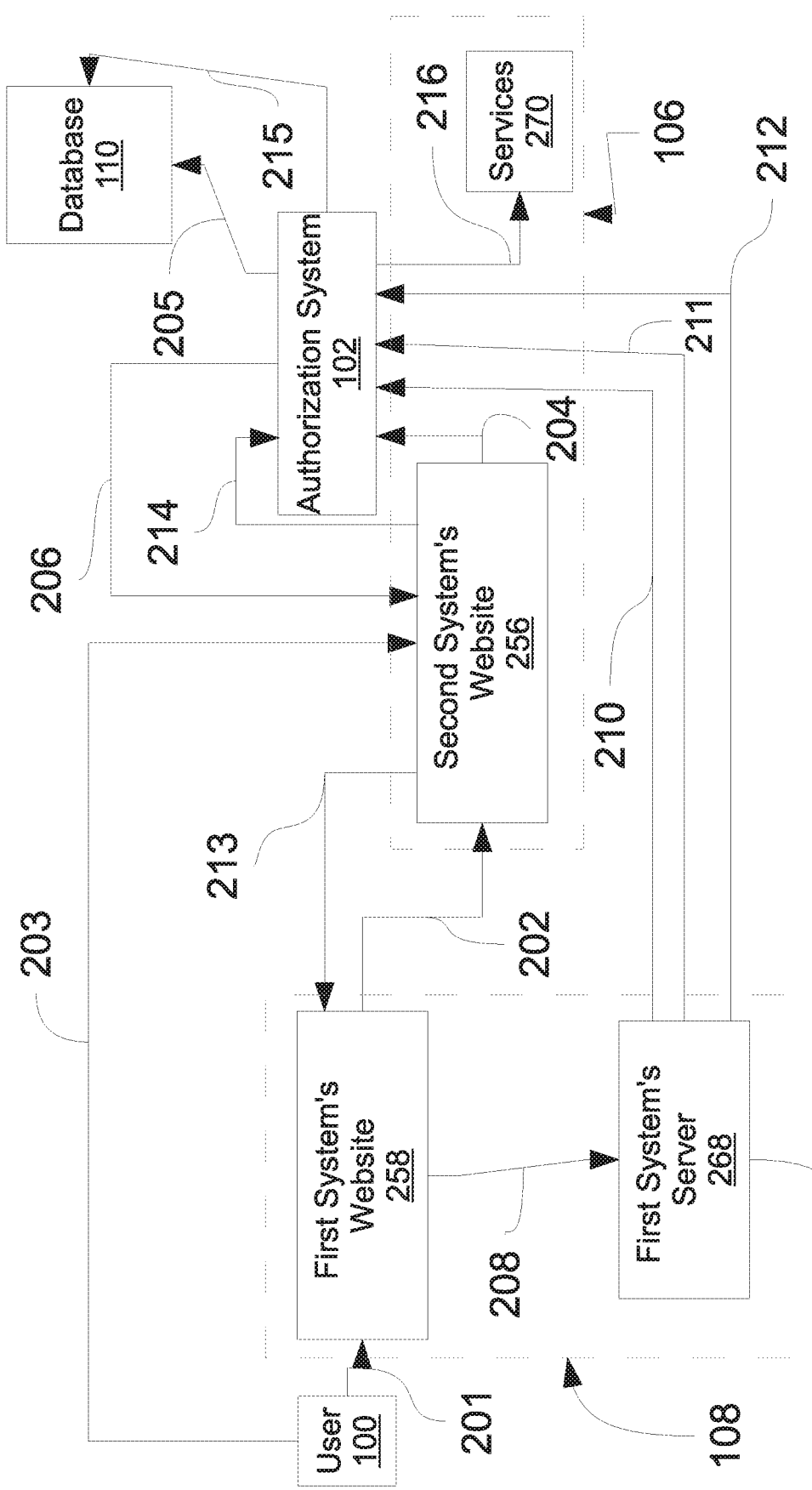
FIG. 2 is a sequence diagram of a system for third-party authorization according to a non-limiting embodiment.

With reference to FIG. 2, a sequence diagram is shown according to a non-limiting embodiment. The example shown in FIG. 2 may be based on an OAuth implementation for authentication. It will be appreciated that the sequence shown in FIG. 2 is for example purposes only and that variations are possible. In non-limiting embodiments, Steps 201-210 represent an enrollment flow for enrolling (e.g., registering) a first system 108 with the second system 106 for authorization. Step 211 represents requesting a new access token. Step 212 represents sending an access token to the authorization system 102. Steps 213-215 represent a revocation of authorization of the first system. Step 216 represents allowing access to the first system 108.

In Step 201, the user 100 navigates to a website or service 258 operated by the first system 108. The first system (e.g., first system 108 shown in FIG. 1) may include both the first system's website or service 258 and the first system's server 268. The user may navigate to the first system's website or service 258 using a user device 104, such as a computing device. The user 100 may be an authorized user of an entity. In non-limiting embodiments, any authorized user of the entity may complete the actions of the user 100.

In Step 202, the first system's website 258 redirects the user 100 to a website or service 256 operated by the second system for authentication. The user 100 may be redirected to the second system's website 256 (e.g., part of the second system 106 shown in FIG. 1) by selecting (e.g., clicking on, touching, and/or the like) a button, link, and/or the like on the first system's website 258. For example, a button may state that it will grant the first system server 268 access.

In Step 203, the user 100 logs into the second system's website 256 and is authenticated with the user's credentials. The user 100 may input their credentials manually, for example, by pressing keys on a keyboard. In non-limiting embodiments, the user's credentials may include a user name, a password, a PIN, two-factor authentication, answers to security questions, personal identification information, and/or the like.

In Step 204, the user 100 is presented with an access grant page (e.g., a GUI) on the second system's website 256, where the user 100 selects one or more selectable options to choose one or more grants. A grant may include a permission or authorization to allow the access of particular information and/or to enable access to services 270 of the second system 106. The grant may allow the first system 108 to enable access to the service and/or the information on behalf of the user 100. The grants available for selection may vary depending on the user 100 and/or the entity associated with the first system 108. In non-limiting embodiments, the first system 108 may submit a list of grants and the user 100 may grant the first system 108 all, some, or none of the grants submitted by the first system 108. In non-limiting embodiments, the user 100 may not be able to grant some of the grants submitted by the first system 108, but instead may be required to grant either all or none of the grants submitted by the first system 108. After the user 100 makes a selection, an API (e.g., "Enroll" API function) of the authorization system 102 is invoked from the second system's website 256 to communicate the following data: a) client identifier (e.g., an identifier for the computing device (client) being provided access, which is previously registered with the first system and received by the client identifier outside of this flow); b) first system identifier (e.g. an identifier for the first system 108, such as a merchant identifier); and c) one or more grants.

In Step 205, the authorization system 102 records the selected grants in a database 110, such as an authorization database, account database, or a separate grant database. The database 110 may be operated by the second system 106 or a third party.

In Step 206, the authorization system 102 returns an authorization code encrypted with the first system's public key to the second system's website 256.

In Step 207, the second system's website 256 redirects the user 100 back to the first system's website 258. The encrypted authorization code may also be redirected to the first system's website 258.

In Step 208, the first system's website 258 sends the encrypted authorization code to the first system 108 (e.g., a server of the first system 108).

In Step 209, the first system's server 268 decrypts the encrypted authorization code using the first system's private key.

In Step 210, the first system's server 268 communicates the authorization code that is digitally signed with the first system's private key to the authorization system 102. The first system 108 may communicate the code directly or indirectly to the authorization system 102. The first system 108 may call the authorization system's API function (e.g., "getToken" function call) with the authorization code. The first system 108 then receives an access token. The access token may grant the first system 108 access for performing services (e.g., business transactions) for a limited period of time. The access token may be based on the grants selected in Step 204 and may only allow the first system 108 to perform actions and/or transactions that were granted to the first system 108.

The access token may have a short validity time. If the access token expires, a new access token may be requested by the first system 108. In Step 211, the first system 108 requests a new access token from the authorization system 102 through the first system's server 268. The first system's server 268 sends a digitally signed refresh token parameter to the authorization system 102. The first system's server 268 may call the authorization system's API function call (e.g., "refreshToken" function call) by passing the digitally signed refresh token parameter to the authorization system 102. The digitally signed refresh token parameter may be passed directly or indirectly to the authorization system 102. The authorization system 102 may verify the refresh token. The authorization system 102 may then communicate an access token to the first system 108. The refresh token may aid in a fully autonomous third-party grant, for example, allowing authorization to be granted without further additional actions by the user 100 after enrollment. In non-limiting embodiments, the refresh token does not expire and may only stop being valid when explicitly revoked.

In Step 212, the first system 108 sends the digitally signed access token to the authorization system 102. The first system 108 may make an API call to the authorization system 102 to pass the digitally signed access token. This differs from existing OAuth techniques in which a bearer token is relied on by the second system 106 to allow the API call. Here, in non-limiting examples, the second system 106 validates the token to have originated from the second system 106 because it uses the first system's public key to validate the digital signature of the access token. In non-limiting embodiments, the digitally signed access token may be validated by the authorization system 102.

In non-limiting embodiments involving an OAuth or similar implementation, the client (e.g., OAuth client) may include, in the token, an Issued At Claim ("iat") field whose format is specified by the JWT standard. The iat field is increased monotonically for each call using any given refresh token. It will be appreciated that various forms of structured data may be used. Moreover, various mechanisms may be used to change the payload of a refresh token. Keeping a count of each call in the payload serves as a countermeasure to an attack in which an attacker somehow obtains a token including, as a payload, a refresh token and a client identifier. In such a scenario, the attacker could possibly re-use that JWT token to obtain additional access tokens for the lifetime of the refresh token (which may be on the order of months or even years). However, if the token created by the client has a constantly changing payload, such as an incrementing/changing value in the iat field, then no single token can be re-used twice. However, an attacker could possibly steal two or more tokens and use them in a cyclic manner to achieve the result that each request's payload is different from the immediately preceding payload. In such a case, monotonically increasing the value of the iat field removes the usability of all previously created tokens in this part of the protocol. Accordingly, stolen and/or compromised tokens would not be valuable to a potential attacker.

In non-limiting embodiments, the refresh token may be valid for a predetermined period of time. The predetermined period of time may be set by the user 100, the first system 108, or the second system 106. On expiration of the refresh token, the first system 108 cannot obtain an access token to initiate transactions. This causes the user 100 to re-grant access to the first system 108 by re-doing the enrollment flow (Steps 201-210). In non-limiting embodiments, in response to determining that a refresh token has failed, a web service call is posted to the user 100 to cause the user 100 to determine if the grants to the first system 108 should be extended by renewing the refresh token. In non-limiting embodiments, another method of communication is sent to the user 100 to renew the refresh token, such as an email, application notification, and/or the like. The authorization system 102 may respond to an API call by returning a new refresh token to the first system 108, ensuring that the first system 108 can obtain a new refresh token programmatically without human intervention.

The existing OAuth protocol does not allow for an access token to be invalidated post creation and does not provide for in-flight token revocation. An OAuth token may be valid until a fixed time specified in the OAuth token and defined by the token creator. In non-limiting embodiments, invalidation of an access token post-creation and in-flight token revocation are provided with the following steps.

In Step 213, the user 100 may log into the second system's website 256 and withdraw access from the first system 108. In non-limiting embodiments, the user 100 may log into the second system's website 256 through the first system's website 258. In other non-limiting embodiments, the user 100 may log into the second system's website 256 directly. The user 100 may revoke all grants to the first system 108 or the user 100 may revoke only some of the grants to the first system 108.

In Step 214, the second system 106 records (e.g., logs) the withdrawal of access (e.g., revocation) with the authorization system 102.

In Step 215, the authorization system 102 records (e.g., logs) the withdrawal of access in its grant database 110. The withdrawal log may include listing an identification of the first system, such as a first system identifier, with a user identification, such as a user identifier in the grant database 110. The withdrawal may include a list of grants that are being withdrawn. The first system 108 may be withdrawn for some users, but still have grants for other users.

For any in-flight business transaction made by the first system 108, the authorization system 102 of the second system's website 256 checks its grant database 110 and, in response to determining that the access has not been revoked, performs step 216. The second system's website 256 may check the grant database 110 by searching the grant database 110 for the first system identifier and the user identifier.

In Step 216, the authorization system 102 allows access by permitting the services 270 (e.g., features, actions, transactions, and/or access) available on the second system 106 to be invoked by the first system 108 on behalf of the user 100. If the access has been revoked, step 216 will not be performed and the authorization system 102 will not allow the first system 108 to invoke the services 270 of the second system 106.

Figure 3:
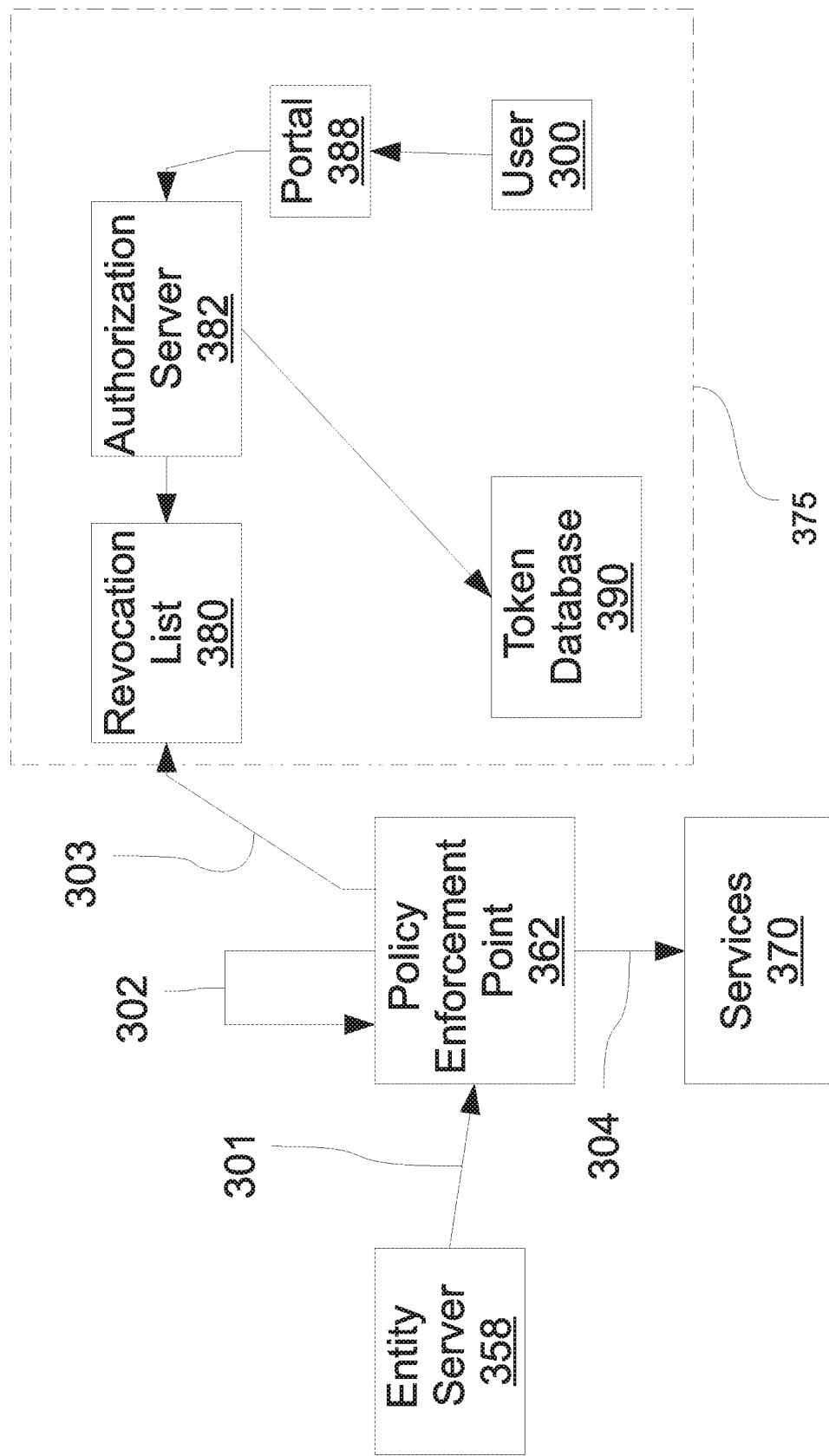
FIG. 3 is another sequence diagram of a system for third-party authorization according to a non-limiting embodiment.

Referring now to FIG. 3, a sequence diagram is shown according to a non-limiting embodiment. It will be appreciated that the sequence shown in FIG. 3 is for example purposes only and that variations are possible.

At Step 301, an entity server 358 sends a token to the Policy Enforcement Point (PEP) 362. The PEP 362 may be, for example, a network device that applies rules to inputted data (e.g., such as tokens). The tokens may include the entity identification, user identification, and scope of grants allowed for the entity server 358.

At Step 302, the PEP 362 validates the token with one of the two keys from a public/private key pair such that the other key is held by the entity server 358 which signs the token with that other key.

At Step 303, the PEP 362 checks the token to determine if it has been revoked or not by querying a revocation list 380 (revocation flow 375 may be independent of the runtime token and is not part of the OAuth protocol). The revocation list 380 may include a list of entity identifications. In non-limiting embodiments, the revocation flow 375 may follow Steps 213-215 as illustrated in FIG. 2. In the revocation flow 375, a user 300 may access a portal 388 to revoke the authorization of the entity server 358. The portal 388 may then record the revocation with an authorization server 382. The authorization server 382 may record (e.g., log) the revocation with a token database 390 and may add the entity identification and user identification to the revocation list 380.

At Step 304, once the token is validated, the PEP 362 allows the entity server 358 access to services 370 (e.g., features, payments, actions, transactions, analytics, updates, profiles, and/or the like). In non-limiting embodiments, the PEP 362 may check the requested service 370 to determine if the service 370 is included in the scope of grants allowed for the entity server 358 prior to allowing the entity server 358 access to the services 370.

Figure 4:
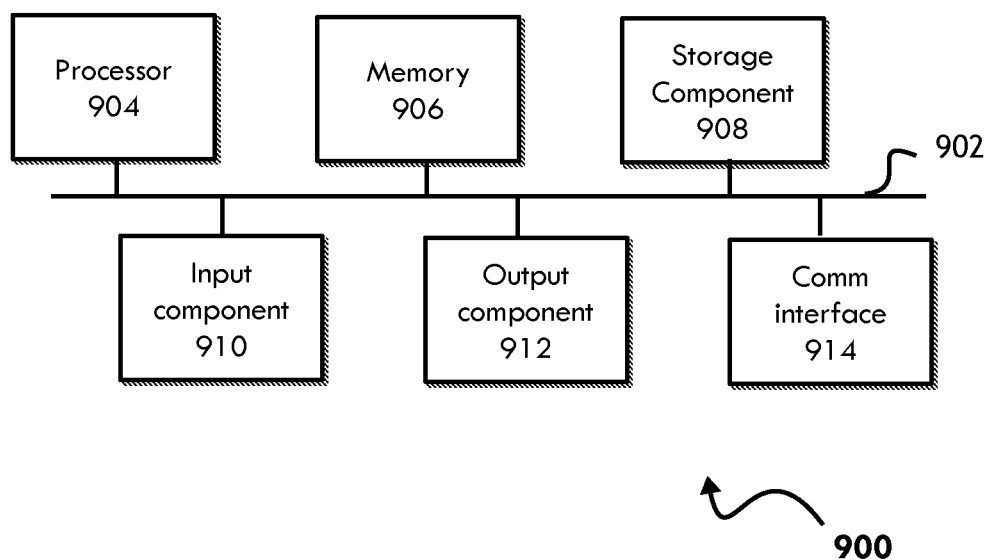
FIG. 4 illustrates example components of a device used in connection with non-limiting embodiments.

Referring now to FIG. 4, shown is a diagram of example components of a device 900 according to non-limiting embodiments. Device 900 may correspond to the user device 104, first system 108, second system 106, and/or authorization system 102 in FIG. 1, first system's server 268 in FIG. 2, and/or the entity server 358, the PEP 362, and/or the authorization server 382 in FIG. 3, as an example. In some non-limiting embodiments, such systems or devices may include at least one device 900 and/or at least one component of the device 900. The number and arrangement of components shown are provided as an example. In some non-limiting embodiments, device 900 may include additional components, fewer components, different components, or differently arranged components than those shown in FIG. 4. Additionally, or alternatively, a set of components (e.g., one or more components) of the device 900 may perform one or more functions described as being performed by another set of components of the device 900.

As shown in FIG. 4, the device 900 may include a bus 902, a processor 904, memory 906, a storage component 908, an input component 910, an output component 912, and a communication interface 914. The bus 902 may include a component that permits communication among the components of the device 900. In some non-limiting embodiments, the processor 904 may be implemented in hardware, firmware, or a combination of hardware and software. For example, the processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by the processor 904.

With continued reference to FIG. 4, the storage component 908 may store information and/or software related to the operation and use of the device 900. For example, the storage component 908 may include a hard disk (e.g., a magnetic disk, an optical disk, a magneto-optic disk, a solid state disk, etc.) and/or another type of computer-readable medium. The input component 910 may include a component that permits the device 900 to receive information, such as via user input (e.g., a touch screen display, a keyboard, a keypad, a mouse, a button, a switch, a microphone, etc.). Additionally, or alternatively, the input component 910 may include a sensor for sensing information (e.g., a global positioning system (GPS) component, an accelerometer, a gyroscope, an actuator, etc.). The output component 912 may include a component that provides output information from the device 900 (e.g., a display, a speaker, one or more light-emitting diodes (LEDs), etc.). The communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. The communication interface 914 may permit the device 900 to receive information from another device and/or provide information to another device. For example, the communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 900 may perform one or more processes described herein. Device 900 may perform these processes based on the processor 904 executing software instructions stored by a computer-readable medium, such as the memory 906 and/or the storage component 908. A computer-readable medium may include any non-transitory memory device. A memory device includes memory space located inside of a single physical storage device or memory space spread across multiple physical storage devices. Software instructions may be read into the memory 906 and/or the storage component 908 from another computer-readable medium or from another device via the communication interface 914. When executed, software instructions stored in the memory 906 and/or the storage component 908 may cause the processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method, comprising:
   receiving a request through a first website associated with a first system, the request initiated by a user through a computing device;
   redirecting the computing device of the user from the first website associated with the first system to a second website associated with a second system, the second website configured to receive credentials associated with the user;
   receiving, from the second system, a request for an authorization code;
   generating, with at least one processor of an authorization system separate from the first system and the second system, the authorization code;
   after generating the authorization code, encrypting, with the at least one processor, the authorization code with a public key associated with the first system, resulting in an encrypted authorization code;
   transmitting the encrypted authorization code to the first system;
   in response to transmitting the encrypted authorization code to the first system, receiving, from the first system, a digitally signed authorization code generated by the first system based on the authorization code and a private key corresponding to the public key associated with the first system;
   after receiving the digitally signed authorization code from the first system, verifying, with the at least one processor, the digitally signed authorization code based on the public key and the authorization code; and
   in response to verifying the digitally signed authorization code, transmitting an access token to the first system, wherein the access token is configured to authorize the user with the first system.

2. The computer-implemented method of claim 1, further comprising receiving, from the second system, access grant data comprising a user identifier associated with the user and at least one grant, wherein the authorization code is generated and/or encrypted in response to receiving the access grant data.

3. The computer-implemented method of claim 1, wherein transmitting the encrypted authorization code to the first system comprises transmitting the encrypted authorization code to the second system, wherein the second system provides the encrypted authorization code to the first system.

4. The computer-implemented method of claim 1, further comprising:
   receiving, from the first system, a digitally signed access token generated by the first system based on the access token and the private key;
   verifying, with the at least one processor, the digitally signed access token based on the public key and the access token; and
   in response to verifying the digitally signed access token, authorizing the user with the second system.

5. A system comprising an authorization system including at least one processor programmed or configured to:
   receive a request through a first website associated with a first system, the request initiated by a user through a computing device;
   redirect the computing device of the user from the first website associated with the first system to a second website associated with a second system, the second website configured to receive credentials associated with the user, wherein the first system and the second system are separate from the authorization system;
   receive, from the second system, a request for an authorization code;
   generate the authorization code;
   after generating the authorization code, encrypt the authorization code with a public key associated with the first system, resulting in an encrypted authorization code;
   transmit the encrypted authorization code to the first system;
   in response to transmitting the encrypted authorization code to the first system, receive, from the first system, a digitally signed authorization code generated by the first system based on the authorization code and a private key corresponding to the public key associated with the first system;
   after receiving the digitally signed authorization code from the first system, verify the digitally signed authorization code based on the public key and the authorization code; and
   in response to verifying the digitally signed authorization code, transmit an access token to the first system, wherein the access token is configured to authorize the user with the first system.

6. The system of claim 5, wherein the at least one processor is further programmed or configured to receive, from the second system, access grant data comprising a user identifier associated with the user and at least one grant, wherein the authorization code is generated and/or encrypted in response to receiving the access grant data.

7. The system of claim 5, wherein transmitting the encrypted authorization code to the first system comprises transmitting the encrypted authorization code to the second system, wherein the second system provides the encrypted authorization code to the first system.

8. The system of claim 5, wherein the at least one processor is further programmed or configured to:
   receive, from the first system, a digitally signed access token generated by the first system based on the access token and the private key;
   verify, with the at least one processor, the digitally signed access token based on the public key and the access token; and
   in response to verifying the digitally signed access token, authorize the user with the second system.

9. A computer program product comprising at least one non-transitory computer-readable medium including program instructions that, when executed by at least one processor of an authorization system, cause the at least one processor to:

receive a request through a first website associated with a first system, the request initiated by a user ah a computing device;

redirect the computing device of the user from the first website associated with the first system to a second website associated with a second system, the second website configured to receive credentials associated with the user, wherein the first system and the second system are separate from the authorization system;

receive, from the second system, a request for an authorization code;

generate the authorization code;

after generating the authorization code, encrypt the authorization code with a public key associated with the first system, resulting in an encrypted authorization code;

transmit the encrypted authorization code to the first system;

in response to transmitting the encrypted authorization code to the first system, receive, from the first system, a digitally signed authorization code generated by the first system based on the authorization code and a private key corresponding to the public key associated with the first system;

after receiving the digitally signed authorization code from the first system, verify the digitally signed authorization code based on the public key and the authorization code; and in response to verifying the digitally signed authorization code, transmit an access token to the first system, wherein the access token is configured to authorize the user with the first system.

10. A computer-implemented method, comprising:

redirecting a computing device of a user from a first website to a second website associated with a second system, the second website configured to receive credentials associated with the user;

receiving, with at least one processor of a first system, an encrypted authorization code from an authorization system;

in response to receiving the encrypted authorization code, decrypting, with the at least one processor, the encrypted authorization code based on a private key associated with the first system, resulting in an authorization code;

after decrypting the encrypted authorization code, digitally signing, with the at least one processor, the authorization code based on the private key, resulting in a digitally signed authorization code;

after digitally signing the authorization code, transmitting the digitally signed authorization code to the authorization system; and receiving, with the at least one processor, an access token from the authorization system, the access token configured to authorize the user with the first system.

11. The computer-implemented method of claim 10, further comprising:

digitally signing, with at least one processor, the access token based on the private key, resulting in a digitally signed access token; and transmitting the digitally signed access token to the authorization system.

12. The computer-implemented method of claim 10, wherein receiving the encrypted authorization code from the authorization system comprises receiving the encrypted authorization code from the second system, wherein the second system receives the encrypted authorization code from the authorization system.

13. A system comprising at least one processor of a first system, the at least one processor programmed or configured to:

redirect a computing device of a user from a first website to a second website associated with a second system, the second website configured to receive credentials associated with the user;

receive an encrypted authorization code from an authorization system;

in response to receiving the encrypted authorization code, decrypt the encrypted authorization code based on a private key associated with the first system, resulting in an authorization code;

after decrypting the encrypted authorization code, digitally sign the authorization code based on the private key, resulting in a digitally signed authorization code;

after digitally signing the authorization code, transmit the digitally signed authorization code to the authorization system; and receive an access token from the authorization system, the access token configured to authorize the user with the first system.

14. The system of claim 13, wherein the at least one processor is further programmed or configured to:

receive a request initiated by the user through the first website associated with the first system; and redirect the computing device of the user from the first website associated with the first system to the second website associated with the second system, wherein the second website is configured to receive credentials associated with the user.

15. The system of claim 13, wherein receiving the encrypted authorization code from the authorization system comprises receiving the encrypted authorization code from the second system, wherein the second system receives the encrypted authorization code from the authorization system.

16. A computer program product comprising at least one non-transitory computer-readable medium including program instructions that, when executed by at least one processor of a first system, cause the at least one processor to:

redirect a computing device of a user from a first website to a second website associated with a second system, the second website configured to receive credentials associated with the user;

receive an encrypted authorization code from an authorization system;

in response to receiving the encrypted authorization code, decrypt the encrypted authorization code based on a private key associated with the first system, resulting in an authorization code;

after decrypting the encrypted authorization code, digitally sign the authorization code based on the private key, resulting in a digitally signed authorization code;

transmit the digitally signed authorization code to the authorization system; and receive an access token from the authorization system, the access token configured to authorize the user with the first system.

* * * * *